Sept. 20, 1927.

S. L. MADORSKY 1,642,683

APPARATUS FOR PRODUCTION OF PURE METAL

Filed July 5, 1924

Witness:
Chas. R. Koursh

Inventor
Samuel L. Madorsky,
By Wallace R. Lane
Attys

Patented Sept. 20, 1927.

1,642,683

UNITED STATES PATENT OFFICE.

SAMUEL L. MADORSKY, OF CHICAGO, ILLINOIS, ASSIGNOR TO GATHMYS RESEARCH CORPORATION, OF CHICAGO, ILLINOIS, A CORPORATION OF ILLINOIS.

APPARATUS FOR PRODUCTION OF PURE METAL.

Application filed July 5, 1924. Serial No. 724,264.

This invention relates to improvements in process and apparatus for the production of pure metal from its ores or the like.

The object of the invention consists in the provision of apparatus in the practice of the process, whereby ore containing an oxide of a metal will be subjected in molten condition to the action of hydrogen gas to reduce the ore, obtaining as a product the metal in pure form and molten condition to which, for instance in the case iron is desired, may be added such constituents as may be desired for the production of various kinds of steel.

In the practice of my process when applied to an ore of iron, for example, magnetite or hematite is placed in a melting furnace with a suitable proportion of fluxing material and subjected to heat until melted. The temperature of this molten mass may be raised to the melting point of the iron or higher if found desirable, and the fluxes will combine with the constituents it is desired to remove to form a slag in well known manner, which slag may be drawn off from the surface of the mass, leaving a purified iron oxide in molten condition. All or a portion of the molten oxide is conveyed to a converter, and pre-heated hydrogen gas is bubbled or passed through the oxide, reducing the same to pure molten iron. I am aware that hitherto suggestions have been made to reduce iron oxide, for example, in molten condition by treatment with hydrogen gas, but none of these suggested processes has appreciated the necessity for pre-heating the hydrogen and maintaining the heat of the molten mass throughout the process, by any heat other than heat liberated by the reaction between the hydrogen and combined oxygen, which heat of reaction is short of that required to maintain the proper temperature, as well as to compensate for radiation and other heat losses. In the practice of my process, I pre-heat the hydrogen preferably by the gas exhausted from the converter, to as high a point as is practical and economical, as for example 900 to 1.000° C.; and also I am enabled to mix with the pre-heated hydrogen being supplied to the molten oxide as shown on the drawing, sufficient oxygen to combine with a portion of the hydrogen, the resultant combustion of which will raise the temperature to the necessary and desired point.

It is also necessary to provide a considerable excess of hydrogen over that actually combining with the oxygen of the iron oxide, and it is desirable to supply at least twice the amount of hydrogen required for this reaction. The excess of hydrogen maintains the reaction stable, but would greatly increase the cost of the process if the excess be not recovered. I therefore provide for the recovery of this excess of hydrogen by collecting the excess exhausted from the converter and absorbing, condensing, or in any convenient manner separating from the commingled gases, the hydrogen which may be compressed and re-used. It may be desirable to recover some of the commingled gases, as for example phosphine, hydrogen sulphide, or the like.

It will generally be found that some of the hydrogen gas has combined with or become occluded in the molten iron which has a tendency to render the same brittle when solid, as is well known. To eliminate any such objectionable result, I may pass oxygen or air through the molten mass in sufficient amount to remove the occluded hydrogen; or free carbon may be mixed with the mass to effect the same result.

If the product desired is pure iron, the content of the converter may be poured into any suitable receptacle. If the manufacture of steel is desired, there may be added to the pure iron in the converter, suitable amounts of carbon, silicon, manganese, or other ingredients, according to the formula followed.

In the accompanying drawings, I have illustrated apparatus for the practice of this process.

Figure 1:
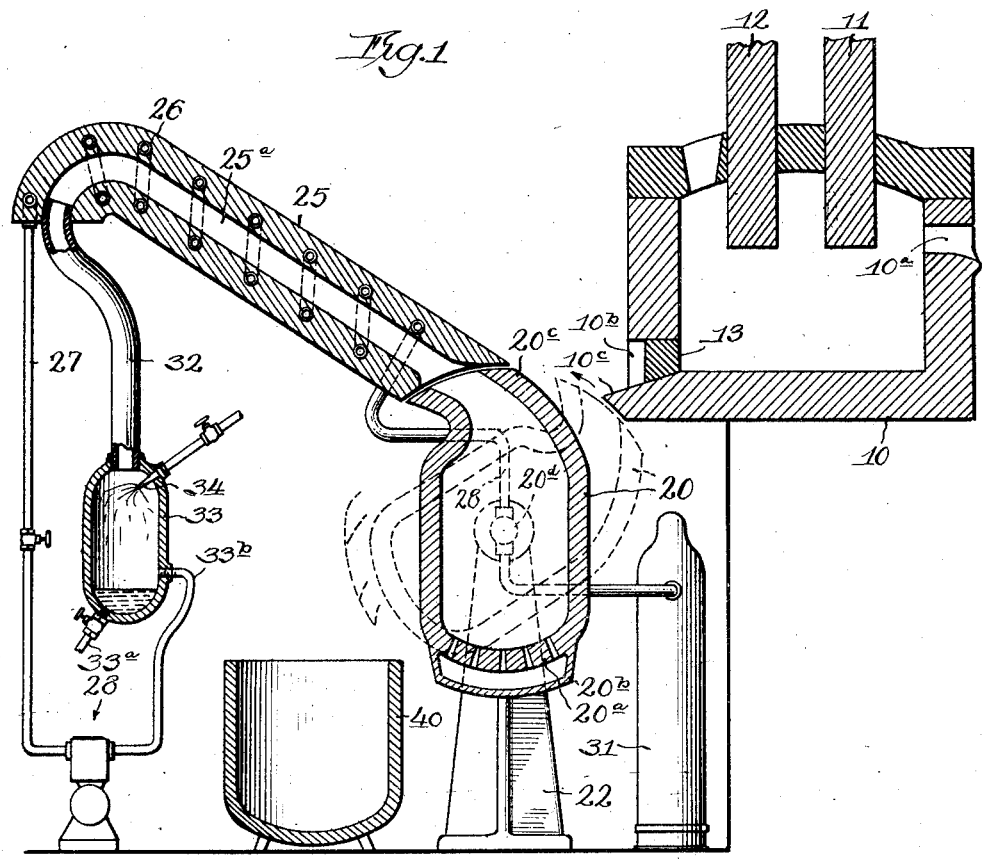
Fig. 1 is a vertical section through apparatus more or less diagrammatically shown for the carrying out of my process.
Figure 2:
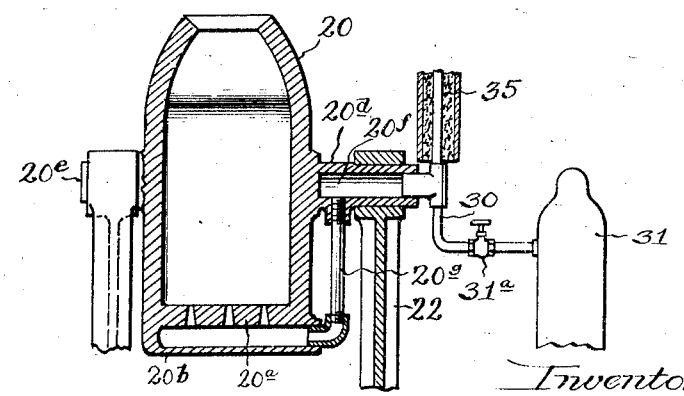
Fig. 2 is a transverse vertical section through the converter showing the arrangement of the trunnions and gas supply.

In the drawings, 10 indicates generally an electric melting furnace having the electrodes 11 and 12, a slag discharge outlet $10^a$, and a tap hole $10^b$ adjacent the bottom of the furnace, this latter being normally closed by the plug 13. The projecting spout or lip $10^c$ extends outwardly from the tap hole $10^b$. Located beneath and in front of the furnace 10 is the converter 20, having the perforated false bottom $20^a$ and the subjacent closed bottom $20^b$. In its upper portion the converter 20 is provided with the spout $20^c$ preferably convexed as shown in Fig. 1. The converter 20 is provided with the trunnions 20$^d$ and 20$^e$, journaled in suitable pedestals 22 projecting upwardly from the floor. 25 designates a discharge duct formed of heat resistant material and having the central discharge passage 25$^a$ with which the spout 20$^c$ aligns, when in the position shown in Fig. 1 in full lines. Located in the wall 25 is the helically coiled tube 26 in communication with the tube 27, which leads from the compressor 28. This tube 26 is continued at its other extremity to communicate with the chamber 20$^f$ in the trunnion 20$^d$, a pipe 20$^g$ leading from such chamber to a space between the false bottom 20$^a$ of the converter and the bottom 20$^b$. From its emergence from the duct 25, the tube 26 is packed in asbestos or other heat insulating material, as indicated by the numeral 35. A second supply tube 30 leads to the pipe 20$^g$ from pressure tank 31 or the like, a valve 31$^a$ being inserted in the line for control of flow therethrough. The passage 25$^a$ leads to the pipe 32 which in turn leads to the cooling chamber 33, in which is mounted a cooling spray 34. The chamber 33 is provided with the passage or drain pipe 33$^a$ and an offtake gas pipe 33$^b$, which leads to the compressor 28.

The converter 20 is pivotally mounted on the trunnions 20$^d$ and 20$^e$ for movement from position beneath the lip 10$^c$ to alignment with the discharge duct 25 into a third position wherein the spout 20$^c$ will overlie the ladle or other receptacle 40. The convexed end of the spout 20$^c$ is such as to permit a close fit between the spout and the duct 25 when in alignment therewith while permitting the pivotal movement described above.

In the practice of my process with the apparatus described, a charge of iron oxide, for example, with suitable fluxing material, is delivered to the furnace 10 and melted in well known manner, after which the slag may be removed through the port 10$^a$. The converter spout 20$^c$ being moved to dotted line position as shown in Fig. 1, the plug 13 may be removed and a charge of purified molten oxide transferred to the converter 20, and the latter returned to the full line position shown in Fig. 1. Hydrogen is flowed through tube 27 and tube 20$^g$ under pressure through the apertured false bottom 20$^a$ and bubbled or forced through the molten oxide. The hydrogen is supplied in considerable excess, preferably twice the amount required for reaction with the combined oxide, and with the gases resulting from the reaction, the excess of hydrogen is passed upwardly through the passage 25$^a$, this exhaust serving to pre-heat the hydrogen being supplied through tube 26. I find it possible to pre-heat this hydrogen to as high as 1,000° C. Even with this pre-heating of the hydrogen and with the heat liberated during the reaction between the hydrogen and the combined oxygen of the oxide, there is insufficient heat to maintain the mass in molten condition. I therefore contemplate the admixture with the inflowing hydrogen of sufficient oxygen which may be pre-heated through tube 30 from tank 31 to react with a portion of the hydrogen, the heat of this reaction being regulated so as to furnish the heat needed to maintain the bath at proper temperature and compensate for the heat units lost through radiation and otherwise.

The excess of hydrogen passing upwardly through passage 25$^a$ is conducted to the cooling tank of chamber 33, where the associated gases are condensed out and the hydrogen is returned through pipe 32$^b$ to the compressor for re-use. I do not wish to be restricted to this particular means for recovering this excess of hydrogen.

After reduction of the oxide to pure metallic form, hydrogen may be occluded therein, which would render the metal brittle and otherwise objectionable, so that I find it desirable in some instances at least to remove this occluded hydrogen, which may be done by the bubbling of air or oxygen through the mass in the converter 20; or, free carbon may be added through the spout 20$^c$, for the same purpose. After final refinement of the molten mass, the converter 20 may be tilted to deliver its content into the ladle 40 or other suitable receptacle. It may be desirable to add alloying ingredients prior to this transfer to the ladle, which may be readily done by adding proper proportions of carbon, silicon, manganese, molybdenum, or other ingredients, according to the formula followed.

The hydrogen may be obtained in any way desirable. One method of obtaining such hydrogen is by electrolytic decomposition of water, in which instance the oxygen obtained at the same time is available for the heat maintenance described above.

It will be obvious that my process and the apparatus shown and described, may be modified without departing from the spirit of my invention, and I do not wish to be restricted to such showing and description, except as defined in the appended claims.

What I claim is:

1. In apparatus of the class described, a melting furnace; a converter having a spout; a discharge duct; said converter being movable to align said spout with said furnace or with said duct; means to supply reducing gas to the contents of said converter, and means associated with said duct to pre-heat said reducing gas prior to such introduction.

2. In apparatus of the class described, a melting furnace; a converter having a spout; a discharge duct, said converter being movable to align said spout with said furnace or with said duct; means to supply reducing gas to the contents of said converter; means to pre-heat said gas prior to such introduction; and means to supply a second gas in desired quantity in admixture with said reducing gas.

3. In apparatus of the class described, a melting furnace having a discharge port, a converter, an exhaust duct, a reducing gas supply tube associated with said duct for pre-heating of such gas; said converter being provided with a spout and movable to align said spout with said furnace port or with said exhaust duct.

4. In apparatus of the class described, a melting furnace having a discharge port, a converter, an exhaust duct, a reducing gas supply tube associated with said duct for pre-heating of such gas; said converter being provided with a spout and movable to align said spout with said furnace port, or with said exhaust duct; and means to recover the excess of reducing gas exhausting through said duct.

5. In apparatus of the class described, a melting furnace having a discharge port, a converter, an exhaust duct, a reducing gas supply tube associated with said duct for pre-heating of such gas, said converter being provided with a spout and movable to align said spout with said furnace port or with said exhaust duct; and means to recover the excess of reducing gas exhausting from said duct and to return the same to said converter.

6. In apparatus of the class described a converter adapted to receive molten ore from a melting furnace, means to supply reducing gas to the contents of the converter, means to pre-heat the reducing gas prior to its introduction into the converter, and means to supply a second gas in desired quantity for reaction with the reducing gas.

7. In apparatus of the class described a converter adapted to receive molten ore from a melting furnace, means to supply hydrogen to the contents of the converter, means to pre-heat the hydrogen before its introduction into the converter, and means to supply oxygen for reaction with said hydrogen.

In witness whereof, I hereunto subscribe my name to this specification.

SAMUEL L. MADORSKY.